US012802305B2

(12) United States Patent
Aidan

(10) Patent No.: US 12,802,305 B2
(45) **Date of Patent: *Nov. 17, 2026**

(54) CONTROLLING VIRTUAL APPEARANCES IN IMAGES THAT ARE CAPTURED AND PROVIDED BY IMAGE-CAPTURING DEVICES

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 18/444,512

(22) Filed: Feb. 16, 2024

(65) Prior Publication Data

US 2025/0265750 A1 Aug. 21, 2025

(51) Int. Cl.
*G06T 11/60* (2026.01)
*G06F 21/62* (2013.01)

(52) U.S. Cl.
CPC .......... *G06T 11/60* (2013.01); *G06F 21/6245* (2013.01)

(58) Field of Classification Search
CPC ... G06T 11/60; G06T 19/006; G06F 21/6245; G06V 40/16; H04N 23/60; H04N 23/611; H04N 23/661
See application file for complete search history.

(56) References Cited

U.S. PATENT DOCUMENTS 11,900,520 B1 2/2024 Boissière et al.
2015/0220777 A1* 8/2015 Kauffmann .......... H04N 23/958 382/103
2023/0230325 A1 7/2023 Lin et al.
2023/0260219 A1 8/2023 Doken
2023/0342487 A1* 10/2023 Joseph ................. G06V 40/166
2023/0345113 A1 10/2023 Liu
2024/0203066 A1 6/2024 Kawashima et al.
(Continued)

FOREIGN PATENT DOCUMENTS

CN 119697337 A * 3/2025 ............. H04N 23/62
WO WO-2017025485 A1 * 2/2017 ............. G06Q 10/10

*Primary Examiner* — Chante E Harrison
(74) *Attorney, Agent, or Firm* — MARSHALL, GERSTEIN & BORUN LLP

(57) ABSTRACT

Via a virtual appearance controller system, a person can define how depictions or virtual appearances of the person are to be controlled in images that are initially captured and subsequently output by image-capturing devices. The person may define various conditions under which various virtual appearance features and/or aspects of the person are to be utilized in such images, and the system may transmit an indication of a selected set of controlling requirements for virtual appearances of the person based on a detected condition. An image-capturing device may receive the set of controlling requirements for the virtual appearances of the person, and may automatically apply the requirements to initially-captured images so that virtual appearances of the person in (any) images that are based on the initially-captured images and provided at a display, transmitted via a communication interface, and/or otherwise output from the image-capturing device are in accordance with the requirements.

20 Claims, 3 Drawing Sheets

(56) References Cited

U.S. PATENT DOCUMENTS

| | | | | |
|---|---|---|---|---|
| 2025/0118034 | A1 | 4/2025 | Burns et al. | |
| 2025/0191302 | A1 | 6/2025 | Nie et al. | |
| 2025/0265749 | A1* | 8/2025 | Aidan | H04N 23/80 |
| 2025/0265750 | A1 | 8/2025 | Aidan | |

* cited by examiner

CONTROLLING VIRTUAL APPEARANCES IN IMAGES THAT ARE CAPTURED AND PROVIDED BY IMAGE-CAPTURING DEVICES

TECHNICAL FIELD

The present disclosure relates generally to systems and methods for controlling virtual appearances of people in images that are captured and provided by image-capturing devices, and in particular, controlling the visual appearances that are captured and provided by image-capturing devices in an a priori manner.

BACKGROUND

Due to the recent rise in the usage of smart devices, augmented reality, and other image technologies, people are becoming increasingly concerned about privacy and control over how their personal appearances are rendered or depicted in images that are captured and provided by image-capturing devices, such as those used by paparazzi, social media content providers, or even strangers on the street. Such control and privacy concerns are particularly important to parents and guardians who do not wish images of their children to be captured and distributed with or without the knowledge and/or consent of the parent or guardian.

Current techniques for controlling appearances of people in images captured images are clumsy and incomplete, at best. For example, people can sign release forms which grant permission to third parties to capture images of themselves at a particular event or location; however, such people do not have any control over how their appearances are rendered or depicted in the captured images. In another example, people may modify a digital image of themselves and/or of their children that they have personally captured (e.g., modify the digital image in an a posteriori manner) prior to posting or otherwise distributing such images, such as by using an editing tool to blur or obscure faces and/or other portions of their and/or their children's appearances. However, these techniques are not easily (and in some cases, cannot be) utilized for images that are captured and provided by other parties.

SUMMARY

Techniques, systems, apparatuses, components, devices, and methods are disclosed for a person to have control, e.g., a priori, over how the person's virtual or digital appearance is to be depicted in images that are captured and provided by an image-capturing device as outputs, e.g., on displays, to image storage repositories, to other devices, and/or to other systems. The person may be a subject whose appearance may be included in images captured by the image-capturing device, and the image-capturing device may be operated and/or controlled by the person or by a third party other than the person. Via one or more of the techniques described herein, the person (or an agent of the person) can define or specify how the person's appearance is to be depicted in images that are output from one or more image-capturing devices. Such definitions or specifications may be provided to the image-capturing device as requirements for controlling the virtual appearance of the person within captured images, and in some cases, in-line with the person being in the field of view of the image-capturing device. As such, the image-capturing device may modify or alter initially captured images in which the person is depicted to be in accordance with the person's requirements prior to the image-capturing device providing the captured images (whether as initially captured or as alterations of the initially captured images) as outputs of the image-capturing device, e.g., prior to displaying the images on displays or screens and prior to sending the images to other devices or systems. Accordingly, captured images that are provided by the image-capturing device as outputs may depict virtual appearances of the subject within the provided images in accordance with the subject's requirements.

The terms "third party" and "third-party" are generally and interchangeably utilized herein to refer to a person, organization, or other entity who or that is utilizing or otherwise controlling an image-capturing device. Generally speaking, an image-capturing device may be a device that captures and provides images in which people can be depicted, such as a smart device, a digital camera, a webcam, or some other device that includes a camera and/or other types of image sensors that that operate to capture and generate images of the field of view of the device. On the other hand, a person who appears or is depicted (at least partially) in images that are captured by an image-capturing device may be different than the party who is utilizing or controlling the image-capturing device. As such, the terms "subject," "subject person," "specific person," or "individual" are generally and interchangeably utilized herein to refer to those persons whose appearances (or parts thereof) may be included or depicted in images captured by the image-capturing device, and who may control, via one or more of the techniques disclosed herein, how the person's virtual appearance is to be depicted within images which are initially captured and subsequently provided by the image-capturing device. Of course, in some situations, the party controlling the image-capturing device and the subject whose image is being captured by the image-capturing device may be the same party, such as when a person utilizes a home webcam to participate in a video call. However, the techniques, systems, apparatuses, components, devices, and methods disclosed herein are equally applicable to situations in which the party controlling the image-capturing device and the subject whose image is being captured by the image-capturing device are different parties.

Further, for ease of reading and not for limitation purposes, the terms "captured images" and "initially captured images" are interchangeably utilized herein to generally refer to images that are initially captured and formed by image-capturing devices, e.g., via cameras and/or other types of image sensors of the device. Typically, such captured images are at least partially digital and depict a field of view of an image-capturing device at the time of image capture. As such, the initially captured images may include images of people who are located within the field of view of the image-capturing device while the images are being captured. The people whose images are included in the initially captured images may have indicated (e.g., a priori and by utilizing at least some of the techniques described herein) the manner in which they would like their virtual appearances to be depicted within images that are initially captured and subsequently provided by the image-capturing devices as outputs. That is, a subject depicted within an initially captured image may have previously defined or specified how the virtual appearance of various aspects or features of the subject is to be depicted or rendered within images (e.g., within any images) that are output by the image-capturing device. Importantly, the defined or specified virtual appearances of people depicted within images that are output or provided by image-capturing devices are not avatars or other types of graphical representations of people which are typically created or generated via drawing and/or graphical editing software (e.g., such as avatars of video game players). Rather, and generally speaking, the defined or specified virtual appearances may be implemented as modifications, alterations, and/or other changes to the depictions of the people within initially captured images. Still importantly, and as will be explained in more detail below, the techniques described herein are different than a posteriori image editing techniques that require an image to be first displayed in order for the image to be modified or altered as, generally speaking, the techniques described herein may be performed prior to any captured image being displayed on or by an image-capturing device and without using any human input to implement the modifications and/or alterations. Generally speaking, the techniques, systems, apparatuses, components, devices, and methods enable a person's virtual appearance within an image to be modified or altered in accordance with the person's preferences in an a priori manner, e.g., prior to the image being presented on any display, prior to the image being transmitted or otherwise provided by the device that captured the image to another device or system, and prior to the image being output from the image-capturing device in any manner.

Still further, while the techniques, systems, apparatuses, components, devices, and methods are generally described herein with respect to enabling a subject person to have control over his, her, or their virtual appearance in images that are initially captured and subsequently provided by image-capturing devices, it is understood that the techniques, systems, apparatuses, components, devices, and methods described herein are easily applicable to enabling an agent of a subject person to control the virtual appearance of the subject person in such types of images. For example, a parent or legal guardian of a child who is under the care or guardianship of the parent/legal guardian may utilize at least some of the techniques described herein to control virtual appearances of the child, a social media manager employed by a celebrity may utilize at least some of the techniques described herein to control virtual appearances of the celebrity, and the like.

Generally speaking, the techniques, systems, apparatuses, components, devices, and methods disclosed within this disclosure enable a user to define or specify how a subject person's virtual appearance in images that are captured and provided by image-capturing devices is to be presented or otherwise controlled, to thereby provide the subject person with control over the subject person's privacy and the subject person's appearances within such images in digital environments and ecosystems. For example, a user may define or otherwise specify a set of requirements for how the subject person is to appear (e.g., requirements for the subject person's virtual appearance) in digital images that are initially captured and subsequently provided by image-capturing devices. Such requirements are generally referred to herein as "controlling requirements," as such requirements control how appearances of a subject person are to be rendered or otherwise presented in digital images that are provided by image-capturing devices to displays, to other devices, and/or to other systems. Generally, an indication of the set of controlling requirements for the appearances of a subject person within digital images may be transmitted to image-capturing devices, and the image-capturing devices may apply the set of controlling requirements to appearances of the subject person within initially captured images so that the appearances or depictions of the subject person within such images are modified to be in accordance with the set of controlling requirements specified by the user prior to being output from the image-capturing devices/. In some implementations, the subject person's virtual appearance in any and all images that are initially captured and subsequently provided by image-capturing devices are modified to be in accordance with the set of controlling requirements for the subject person's virtual appearances, and any depictions of the subject person that are not in accordance with the set of controlling requirements corresponding to the subject person are prevented from being provided by the image-capturing devices as outputs, e.g., to displays, to other devices, and/or to other systems. The transmission of the set of controlling requirements and the application of the set of controlling requirements to initially captured images of a subject person may be triggered by various conditions.

In an example embodiment, a first device includes an image-capturing component including at least one image sensor, a wireless transceiver, one or more processors and one or more memories storing computer-executable instructions. The computer-executable instructions, when executed by the one or more processors, cause the first device to receive, via the wireless transceiver and from a second device, an indication of a set of controlling requirements for virtual appearances of a subject person in images that are output by the first device. Additionally, the computer-executable instructions, when executed by the one or more processors, cause the first device further to, subsequent to the reception of the indication of the set of controlling requirements corresponding to the subject person, capture, via the image-capturing component, an initial image in which the subject person is depicted; alter the initial image in accordance with the set of controlling requirements corresponding to the subject person, thereby generating an altered image including a controlled virtual appearance of the subject person; and provide the altered image via one or more outputs of the first device.

DETAILED DESCRIPTION

Figure 1:
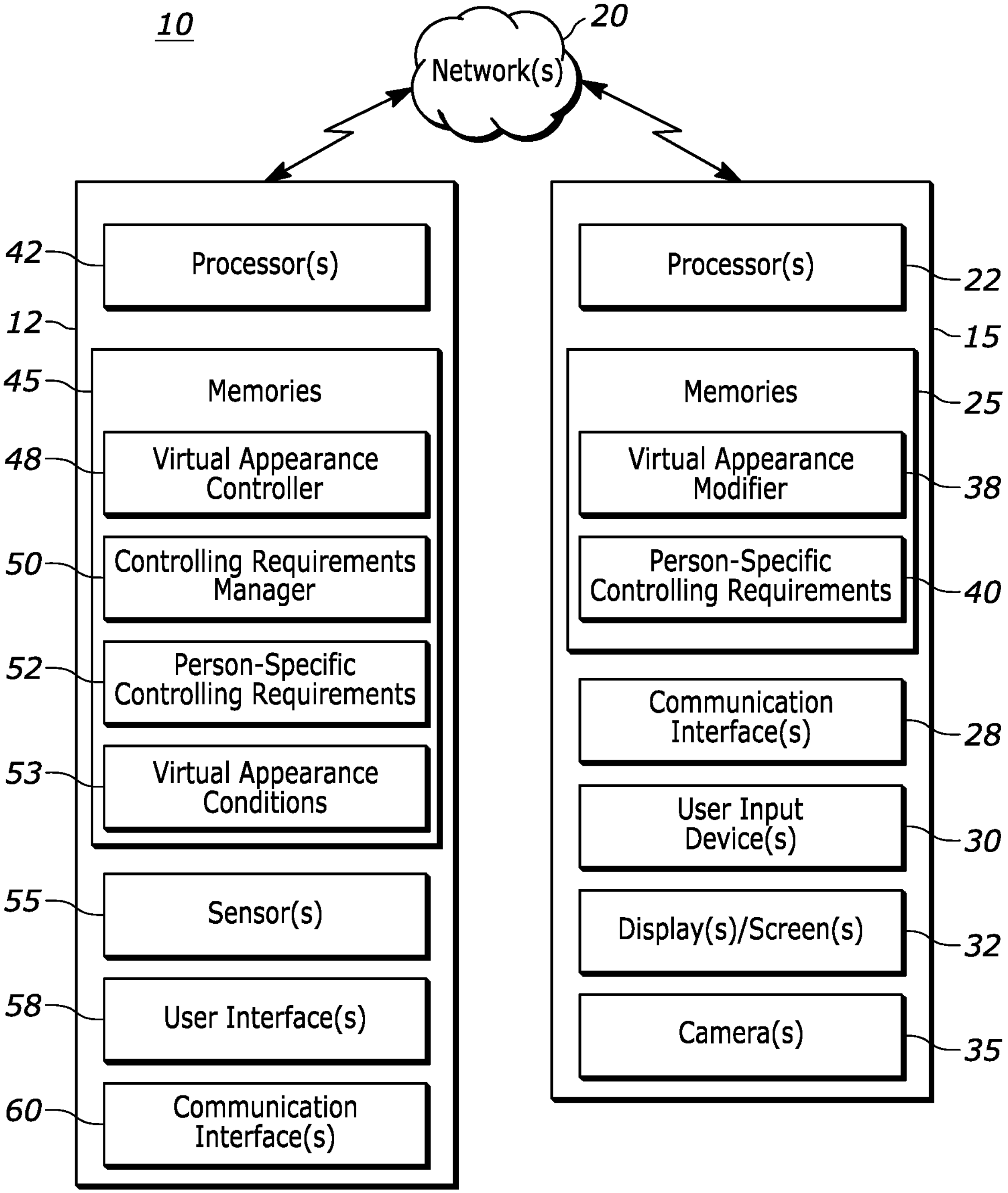
FIG. 1 depicts an example environment in which techniques for controlling virtual appearances of people depicted in images provided by image-capturing devices may be implemented.

FIG. 1 depicts an example environment 10 in which techniques for users to control virtual appearances of subject persons (which may be the users themselves) depicted in images provided by image-capturing devices may be implemented, according to embodiments. Such images may be static images or may be dynamic images that change over time, such as video images. As seen in FIG. 1, the environment 10 includes an example system 12 for controlling virtual appearances of people depicted in captured images (e.g., a "virtual appearance controlling system 12"), and an example image-capturing device 15. The system 12 and the image-capturing device 15 may be communicatively connected or coupled via one or more networks 20. For example, the one or more networks 20 may be a single communication link directly connecting the system 12 and the image-capturing device 15 (e.g., a direct wireless link), or one or more networks 20 may include multiple links and/or communication networks of one or more types (e.g., one or more wired and/or wireless local area networks (LANs), and/or one or more wired and/or wireless wide area networks (WANs) such as the Internet, public networks, private networks, etc.). For ease of reading herein (and not for limitation purposes), the one or more networks 20 may be referred to using the singular tense.

The image-capturing device 15 is associated with and under the control of a party, which may be a person, organization, or other entity who or that is utilizing or controlling the image-capturing device 15 and, in particular, who or that is utilizing or controlling the image-capturing device 15 to capture, generate, and/or provide images (e.g., digital images) in which appearances of other people may be included. The party who or that is utilizing or controlling the image-capturing device 15 may or may not be the subject depicted in initially captured images and may or may not be the party who or that is controlling the virtual appearance controller system 12. For example, the party who or that is utilizing or image-capturing device 15 may be the subject or may be a third-party.

The image-capturing device 15 may be, for example, a smartphone, a smart device, a tablet, a laptop, a phablet, a wearable electronic or computing device, another type of personal computing device, a smart glass device, a smart watch device, an augmented reality device, a virtual reality device, a digital camera, or the like. As such, and as shown in the embodiment depicted in FIG. 1, image-capturing device 15 includes one or more processors 22, one or more tangible memories 25, one or more communication interfaces 28, one or more user input devices 30, one or more screens and/or displays 32, and one or more cameras, image sensors, and/or other types of sensor-based digital image-capturing components 35. For ease of reading herein, and not for limitation purposes, the one or more processors 22 may be referred to using the singular tense, the one or more memories 25 may be referred to using the singular tense, and the one or more communication interfaces 28 may be referred to using the singular tense. Additionally, for ease of reading herein and not for limitation purposes, the cameras, image sensors, and/or other types of sensor-based digital image-capturing components 35 may be collectively and/or interchangeably referred to herein using the singular tense as "camera 35." In some embodiments, camera 35 may include one or more initial imaging applications via which initially captured digital images may be formed from sensed data provided by camera 35.

The one or more processors 22 may include any suitable number of processors and/or processor types (e.g., one or more central processing units (CPUs)); however, as previously mentioned, the one or more processors 22 may be referred to herein using the singular tense for ease of reading (and not limitation) purposes. Processor 22 may include one or more CPUs and one or more graphics processing units (GPUs), for example. Generally, processor 22 is configured to execute software and/or other types of computer-executable instructions stored in the memory 25 of the device 15. As shown in FIG. 1, processor 22 may be specifically configured to execute a virtual appearance modifier 38 that is stored on memory 25. The virtual appearance modifier 38 may comprise a particular set of computer-executable instructions which may be included at least partially in an operating system of the image-capturing device and/or which may be included at least partially in an application executing at the image-capturing device, such as a client application. Generally speaking, and as will be described in more detail elsewhere herein, virtual appearance modifier 38, when executed by the processor 20, may be configured to cause the image-capturing device 15 to modify or alter, in accordance with (previously obtained) respective person-specific controlling requirements 40, appearances of people within images that are initially captured by camera 35 of image-capturing device 15. Person-specific controlling requirements 40 may also be stored in memory 25 of the image-capturing device 15, as will be described in more detail elsewhere herein.

Generally, the one or more memories 25 of the image-capturing device 15 may include one or more persistent memories (e.g., Random Access Memories (RAMs), Read-Only Memories (ROMs), flash memory, hard drive, solid state, etc.) and, as previously mentioned, may be referred to herein using the singular tense for ease of reading (and not limitation) purposes. Memory 25 may store thereon an operating system, data storage, a plurality of software applications, and/or a plurality of software routines. The operating system, for example, may include one or more of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively, and/or may include any suitable operating system. Additionally, as shown in FIG. 1, memory 25 stores the virtual appearance modifier 38, one or more sets of person-specific controlling requirements 40, and optionally other instructions and other data (not shown) that may be used and/or generated by virtual appearance modifier 38.

As shown in FIG. 1, the one or more communication interface(s) 28 of the image-capturing device 15 includes at least one wireless communication interface which includes hardware, firmware, and/or software that is generally configured to communicate with other devices (including at least other mobile devices) and/or over the network 20 using one or more wireless communication protocols. For example, the one or more communication interfaces 28 may be configured to transmit and receive data using a Bluetooth protocol, a Wi-Fi® (IEEE 802.11 standard) protocol, a near-field communication (NFC) protocol, a cellular (e.g., GSM, CDMA, LTE, WiMAX, etc.) protocol, a peer-to-peer wireless protocol, a short-range wireless protocol, and/or other suitable wireless communication protocols. The one or more communication interfaces 28 may include one or more transceivers to support various different wireless communication protocols; however, as previously mentioned, for ease of reading (and not limitation purposes) herein, the one or more communication interfaces 28 may be referred to herein using the singular tense. Additionally, although not shown in FIG. 1, it is understood that, in some implementations, communication interface 28 may include one or more wired communication interfaces which may be utilized by the image-capturing device 15 to communicatively connect to the network 20 and/or to other devices via one or more wired communications or data protocols.

The image-capturing device 15 may include one or more user input device(s) 30 configured to enable image-capturing device 15 to accept or receive inputs of a user or person who is operating the device 15. For example, user input device(s) 30 may include an integrated or external keyboard, a mouse or touch pad, a touch screen, a microphone, etc., along with associated software and/or firmware. In some arrangements, at least some of user input device(s) 30 include a remote input device that is not integral to the image-capturing device 15. In these arrangements, a user or person who is operating the device 15 may enter user input via the remote input device, and the remotely-entered user input may be transmitted from the remote input device to the image-capturing device 15, e.g., via communication interface 28, for example. Display 32 may use any suitable display technology (e.g., LED, OLED, LCD, etc.), and in some embodiments may be integrated with input device(s) 30 as a touchscreen display. In some embodiments, the display 32 may not be integral to the image-capturing device 15 and may receive instructions from the image-capturing device 15 via wired and/or wireless transmissions over communication interface 28, for example. In an embodiment, user input device(s) 30 and display 32 may combine to form an integral user interface to enable an operator of the device 15 to interact with graphical user interfaces (GUIs) provided by image-capturing device 15.

Turning now to the system 12 shown in FIG. 1, as the system 12 is for controlling virtual appearances of people depicted in images captured, generated, and/or provided by image-capturing devices (such as the device 15), the system 12 is interchangeably referred to herein as a "virtual appearance controller system 12." The virtual appearance controller system 12 may include one or more remote and/or local servers, a group (e.g., cluster or cloud) of multiple servers, and/or one or more other suitable types of computing devices or systems. In some embodiments, the system 12 may additionally or alternatively include a personal electronic device (PED) of a subject person who desires to control his, her, or their virtual appearance in images that are provided or output by image-capturing devices. In these embodiments, the PED of the subject person may be a smart phone, a smart device, a wearable device (e.g., wrist band or watch, necklace, earring, pin, or other type of accessory, a garment or piece of clothing, etc.), or another type of PED that is being worn or ported by the subject person. In embodiments in which system 12 includes such a PED of the subject person, the user's PED and the image-capturing device 15 may be respectively located in sufficient proximity to each other so that image-capturing device 15 is able to receive (e.g., directly receive) wireless signals transmitted by the PED of the subject person, as will be discussed in more detail elsewhere herein.

At any rate, whether the virtual appearance controller system 12 includes a PED of the subject person, one or more servers, and/or one or more computing devices and/or systems, the system 12 generally includes one or more processors 42. The one or more processors 42 may include any suitable number of processors and/or processor types (e.g., one or more central processing units (CPUs)); however, the one or more processors 42 may be referred to herein using the singular tense for ease of reading (and not limitation) purposes. Generally, processor 42 is configured to execute software and/or other types of computer-executable instructions that are stored in one or more persistent memories 45 of system 12 and that particularly configure the system 12 to allow users to control their appearances as provided or output by other image-capturing devices (e.g., image-capturing device 15). The one or more persistent memories 45 may be tangible, non-transitory memories and may include Random Access Memories (RAMs), Read-Only Memories (ROMs), flash memory, hard drives, solid state memories, data banks, cloud data storage, and/or other types of persistent memories. In some implementations (not shown), the persistent memories 45 may include one or more persistent memories that are located remotely from the system 12 (e.g., remote data banks, etc.). For ease of reading herein and not for limitation purposes the one or more memories 45 of the system 12 may be referred to herein using the singular tense.

As depicted in FIG. 1, the computer-executable instructions stored on memory 45 and executed by processor 42 of the virtual appearance controller system 12 may include a virtual appearance controller 48 and a controlling requirements manager 50. Generally, and as will be described in more detail below, the controlling requirements manager 50 enables a user to define, specify, modify, delete, update, and/or select (e.g., via one or more user interfaces 58 of the system 12) one or more sets of controlling requirements 52 that are specific to a subject person who may be depicted within images and for whom the user has agency, such the user themselves, a child of the user, a celebrity whose social media appearances are managed by the user, etc. Additionally or alternatively, the controlling requirements manager 50 enables the user to add, modify, delete, specify, and/or update (e.g., via one or more user interfaces 58 of the system 12) various conditions under which various sets of person-specific controlling requirements 52 are to be applied to images captured by other devices (such as by the device 15) and in which the subject person is depicted. In some scenarios, the respective presence of at least some of the conditions may be detected by one or more sensors 55 of the system 12. Examples of conditions may include a presence of a specific image-capturing device, a presence of any image-capturing device, a date, a time, a specific physical location, a type of physical location, a specific virtual location, a type of virtual location, an event, an event type, a user instruction or command, and/or other conditions that are detectable by the sensors 55. The one or more sets of controlling requirements 52 and the one or more conditions 53 specified by the user may be stored in memory 45 of system 12, e.g., as shown in FIG. 1. In some implementations (not shown), the memories 45 of the system 12 may store one or more respective sets of person-specific controlling requirements 52 for multiple different people and/or one or more respective sets of conditions 53 related to controlling virtual appearances for multiple different people.

The virtual appearance controller 48 executes to cause the system 12 to control the virtual appearances of the subject person which are included in captured images in accordance with a set of person-specific controlling requirements 52, for example, by transmitting indications of corresponding person-specific controlling requirements 52 to image capturing devices 15. In some situations, virtual appearance controller 48 may cause the system 12 to detect a condition and, responsive to the detected condition, select a set of person-specific controlling requirements and transmit an indication of the selected person-specific controlling requirements to one or more image-capturing devices, such as the device 15.

The virtual appearance controller system 12 includes one or more user interfaces 58, which may include one or more suitable types of user input devices, such as keyboards, touch screen displays, microphones, and/or any suitable types of remote and/or local user input devices. Further, the one or more user interfaces 58 may include one or suitable types of output devices, such as touch screen displays, speakers, mice, touch pads, and the like. The user interfaces 58 may include one or more local interfaces, and/or may include one or more remote interfaces that are communicatively connected to the system 12 via the network 20 (e.g., that are provided by an application, web browser, or other software executing on a PED of the subject person). For ease of reading (and not limitation) purposes, user interface(s) 58 may be referred to herein using the singular tense.

Virtual appearance controller system 12 also includes one or more communication interfaces 60, which may include, for example, one or more wireless interfaces configured to support one or more wireless communications and/or data protocols (e.g., via respective transceivers) and/or one or more wired interfaces configured to support one or more wired communications and/or data protocols (e.g., via respective transceivers). For example, system 12 may communicatively connect to the network 20 and/or directly to the image-capturing device 15 (and optionally, to other image-capturing devices) via the one or more communication interfaces 60. The one or more communication interfaces 60 may include one or more wireless interfaces that are configured to transmit and receive data using a Bluetooth protocol, a Wi-Fi (IEEE 802.11 standard) protocol, a near-field communication (NFC) protocol, a cellular (e.g., GSM, CDMA, LTE, WiMAX, etc.) protocol, a peer-to-peer wireless protocol, a short-range wireless protocol, and/or other suitable wireless communication protocols. For ease of reading (and not limitation) purposes, the one or more communication interfaces 60 may be referred to herein using the singular tense.

Of course, in some embodiments, the environment 10 includes additional and/or alternate components not shown in FIG. 1.

Generally speaking, the virtual appearance controller 48 of the system 12, when executed by processor 42, may cause the virtual appearance controller system 12 to detect, via the one or more sensors 55, the presence of a condition under which the depiction or virtual appearance of a subject person within images that are initially captured and subsequently provided or output by other image-capturing devices (e.g., the image-capturing device 15) is to be controlled. Responsive to the detection of the condition, the virtual appearance controller 48 may obtain a set of person-specific controlling requirements 52 for virtual appearances of the subject person, and may cause the system 12 to transmit, via communication interface 60 and to image-capturing of the obtained set of person-specific controlling requirements 52 so that virtual appearances of the subject person depicted in one or more images that are initially captured and subsequently provided or output by the image-capturing device 15 (e.g., to displays, other devices, and/or other systems) are in accordance with the set of person-specific controlling requirements 52. Typically, at least a portion of the set of person-specific controlling requirements 52 have been or are defined or specified by the subject person who desires to control his, her, or their virtual appearances, e.g., by a user of the system 12. Furthermore, the subject person may also define or specify the (potentially different) conditions 53 under which various (potentially different) controlling requirements 52 are to be applied to the captured images in which the subject person is depicted.

To illustrate using an example scenario, a subject person who wishes to control the subject person's virtual appearance in images that are provided or output by image-capturing devices may define or specify (e.g., via the controlling requirements manager 50 and the user interface 58) a set of controlling requirements 52 that are specific to the subject person, and the defined or specified set of controlling requirements 52 may be saved as person-specific controlling requirements 52 in memories 45 of the system 12. The person-specific controlling requirements 52 may include virtual appearance contents, which may generally define or specify how one or more features and/or aspects of the subject person's virtual appearance (or, in some cases, the overall virtual appearance of the subject person as a whole) are to appear in any images that are initially captured and subsequently provided or output by image-capturing devices such as the device 15. For ease of reading herein, an image that is "initially captured" by the device 15, as utilized herein, refers to a dataset specifying the contents (e.g., payload) of a digital image, where the dataset is the dataset that is initially generated by the device 15 from imaging data sensed by camera 35. On the other hand, images that are "provided" or "output" by the device 15, as utilized herein, refer to a digital image that is presented on a screen or display 32 of the device, that is transmitted from the device 15 via a communication interface 28, and/or that is output or otherwise provided for consumption by a human or a device other than the device 15. As such, an initially captured and subsequently provided image refers to a provided image which is based on or some form of an image that is initially captured by an image-capturing device, such as the device 15. In some situations, the initially captured image and the subsequently provided image may be the same image. In some cases, the subsequently provided image may include a modification to the initially captured image.

At any rate, in some scenarios, the subject person may associate various person-specific controlling requirements 52 with one or more virtual appearance conditions 53 under which the various virtual appearance contents are to be utilized in the images in which the subject person is depicted and that are initially captured and subsequently provided by image-capturing devices. For example, the person-specific controlling requirements 52 may include indications of associations between various different virtual appearance contents included therein and various different conditions 53, so that certain virtual appearances are utilized under certain conditions, and other virtual appearances are utilized under other conditions.

With respect to the virtual appearance contents included in the person-specific controlling requirements 52, the user may define or specify, as virtual appearance contents, that a particular feature of the subject person's virtual appearance is to have a certain appearance within initially captured and subsequently provided images (e.g., shape of eyebrows, hair color and/or style, amount of puffiness in the user's face, etc.), and/or the user may specify a substitution for a particular feature of the subject person (e.g., brown hair for blond hair, pale skin for sunburned skin, blue eyes for brown eyes, clean-shaven for facial hair, etc.) as depicted within initially captured and subsequently provided images. Additionally or alternatively, the user may specify the appearance of specific of clothing and/or accessories worn by the subject person (e.g., specific shape of glasses, blurring out of company logos on clothing, specific makeup looks that are applied to the subject person, specific type of jewelry, etc.) in initially captured images and subsequently provided images. Further additionally or alternatively, the user may specify an altering of the subject person's gender, an altering of the shape of the subject person's body overall and/or of particular parts of the subject person's body, an altering of the height of the subject person, and/or alterations of other aspects of the bodily appearance of the subject person in such images. In some situations, the user may specify that the virtual appearance of the subject person is to be altered into another form altogether (e.g., that of an animal, a fictional character, an abstract shape, etc.), or that various portions of the subject person's appearance (e.g., the subject person's face) are to be blurred out or otherwise obscured in such images. Still further, if desired, the user may define one or more different virtual appearance profiles of the subject person, where each virtual appearance profile may include a respective group or combination of specified or defined appearances of features, clothing, accessories, and/or forms of the subject person in such initially captured and subsequently provided images.

The controlling requirements manager 50 may provide, via the user interface 58, a field, a view, an application, and/or other suitable mechanism via which the user is able to define or specify person-specific virtual appearance contents 52. For example, the controlling requirements manager 50 may provide, via the user interface 58, a menu of pre-defined virtual appearance options among which the user may select to indicate preferences. Additionally or alternatively, the controlling requirements manager 50 may provide, via the user interface 58, a field, a view, or an application via which the user is able to explicitly define, e.g., by using natural language, how at least some aspects and/or features of the subject person's virtual appearance are to appear in captured images. Still additionally or alternatively, the controlling requirements manager 50 may, via the user interface 58, direct the user to obtain a digital image of the subject person (e.g., a source image) and to use image editing techniques on the obtained source image to modify or otherwise alter the subject person's appearance within the obtained image according to desired preferences. After the user has altered or modified the depiction of the subject person within the source image to the user's satisfaction, the controlling requirements manager 50 may capture and store the alterations or modifications as new virtual appearance contents in the person-specific controlling requirements 52. Generally speaking, the user interface 58 provided by the controlling requirements manager 50 may be configured to enable the user to define, specify, modify, delete, update, and/or select one or more sets of controlling requirements 52 for virtual appearances of the subject person.

At some time after virtual appearance contents of the subject person have been stored as person-specific controlling requirements 52, the system 12, e.g., via the virtual appearance controller 48, may obtain a particular appearance aspect, feature, and/or appearance profile definition for virtual appearances of the subject person from the stored, person-specific controlling requirements 52. The virtual appearance controller 48 may utilize the obtained particular appearance aspect, feature, and/or appearance profile definition to control virtual appearances of the subject person within images that are initially captured and subsequently provided by image-capturing devices, for example, by transmitting an indication of the obtained particular appearance aspect, feature, and/or appearance profile definition to one or more image-capturing devices. Upon reception of the same, an image-capturing device may modify or alter an initially captured image in which the subject person is depicted in accordance with the obtained particular appearance aspect, feature, and/or appearance profile definition so that the subsequently provided or output image corresponding to the initially captured image includes the required virtual appearance of the subject person.

The indication of the obtained particular appearance aspect, feature, and/or appearance profile definition may be represented by any suitable indication. For example, the indication of the obtained particular appearance aspect, feature, and/or appearance profile definition may be a filter or other similar technique that an image-capturing device can apply to initially captured images in which the subject person is depicted to generate a subsequently provided image in which the virtual appearance of a subject person is in accordance with the obtained definition. Alternatively, the indication of the obtained particular appearance aspect, feature, and/or appearance profile definition may be represented by a code (e.g., a QR code, a bar code, or other suitable digital coding paradigm) or other suitable type of indication. Of course, other types of indications of the virtual appearance requirements of the subject person are possible.

In some situations, instead of defining or specifying person-specific controlling requirements 52 in an a priori manner, a user may utilize user interface 58 of the system 12 to define or specify various appearance aspects and/or appearance profiles of the subject person in real-time, on demand, or at any desired time, and such definitions or specifications may be indicated to image-capturing devices upon their definition/specification, e.g., in-line with the reception of the definition/specification via the user interface 58. In an embodiment, the system 12 may, in-line with the receiving of the person-specific definitions and/or specifications via the user interface 58, transmit the received definitions and/or specifications to one or more image-capturing devices to thereby control virtual appearances of the subject person within images that are being initially captured and subsequently provided by the image-capturing devices. For example, a subject person may be wearing or carrying a PED which is included in the system 12, and the subject person may see that another person in the subject person's proximity has started to record video using a smart device or camera. The subject person may, in real-time and via user interface 58 and controlling requirements manager 50, specify to the PED that the subject person's face is to be blurred out in images that are captured and provided by the other person's smart device or camera, and consequently the controlling requirements manager 50 may transmit an indication of the face-blurring requirement of the subject person to the other person's smart device or camera. In addition to being transmitted to the other person's smart device or camera, the received visual appearance specifications may be stored as new or additional person-specific controlling requirements 52.

Turning now to the virtual appearance conditions 53, the controlling requirements manager 50, via the user interface 58, may provide the user with the ability to specify or define one or more sets of conditions 53 under which the user desires various different virtual appearance contents 52 of the subject person are to be utilized in images that are initially captured and subsequently provided or output by image-capturing devices. For example, the user may specify one or more conditions 53 under which a particular appearance feature, aspect, or visual appearance profile corresponding to the subject person is to be utilized in the provided or output images. That is, the user may define which different aspects of the subject person's virtual appearance contents are to be utilized under which different conditions, and such defined associations between virtual appearance contents and conditions may be stored in the person-specific controlling requirements 52. Examples of possible conditions include specific locations and/or events (e.g., social gatherings, red carpet occasions, meet and greets, conventions, etc.), public spaces with surveillance cameras and/or in which other people's PEDs are able to capture images of the subject person, on-line video calls, conferences, events, gaming and virtual reality environments, and smart glass environments, to name a few. Other examples of conditions may include a time of day, date, and/or physical or virtual location in which the subject person is disposed, and/or an instruction or command issued by the user or subject person (e.g., via user interface 58). The conditions 53 that are defined or specified via user interface 58 may be stored in the memories 45 of the system 12. Further, the associations of conditions 53 to various person-specific visual appearance contents 52 may be stored in the memories of the system 45, e.g., as or in conjunction with the person-specific controlling requirements 52, and the virtual appearance controller 48 may select specific visual appearance content 52 to indicate to image-capturing devices based on detected conditions 53 and the stored associations.

The controlling requirements manager 50 may provide a field, a view, an application or other suitable mechanism on user interface 58 via which the user is able to define or specify one or more conditions 53 under which images of the subject person that are captured by image-capturing devices are to controlled in accordance with at least one person-specific virtual appearance controlling requirement 52, and optionally define or specify associations of various virtual appearance controlling requirements 52 to different conditions 53. For example, the user may specify that a first makeup look is to be utilized for certain events and a second makeup look is to be utilized for other events, and/or the user may specify that the subject person's face is to be blurred in images which are captured in public spaces. In an embodiment, the controlling requirements manager 50 may provide, via the user interface 58, a menu of pre-defined condition options among which the user may select to indicate preferences, and the user may be able to associate selected conditions with various virtual appearance contents 52 (e.g., by drag-and-drop, by entering new virtual appearance conditions, and/or by using other suitable techniques). Additionally or alternatively, the controlling requirements manager 50 may provide, via the user interface 58, a field, a view, or an application via which the user is able to explicitly define, e.g., via natural language, at least some conditions 53 and optionally of associations of various virtual appearance contents 52 to the conditions 53. The controlling requirements manager 50 may capture any user definitions or specifications of conditions 53 and any associations of conditions 53 with respective virtual appearance contents 52, and may store the captured information in memory 45. Generally speaking, the user interface 58 provided by the controlling requirements manager 50 may be configured to enable the user to define, specify, modify, delete, update, and/or select one or more conditions 53 under which at least one person-specific controlling requirement 52 is to be utilized for virtual appearances of the subject person within images captured by image-capturing devices, and to define, specify, modify, delete, update, and/or select associations of different conditions 53 to respective person-specific controlling requirements 52.

At any rate, and continuing with the example scenario, the image-capturing device 15 may receive the indication of the set of person-specific controlling requirements 52 transmitted by the virtual appearance controller system 12, and may modify or alter an image that the image-capturing device 15 has initially captured (e.g., via camera 35) and in which the subject person is depicted so that the appearance or depiction of the subject person within the modified or altered image is in accordance with the person-specific set of controlling requirements 52. Typically, the modification or alteration to the initially captured image is performed by the image-capturing device 15 without any in-line human input and prior to providing any form of the initially captured image (e.g., unaltered or otherwise) to or at any output of the device 15 (e.g., to or at screen or display 32, communication interfaces 28, etc.). In some implementations, the image-capturing device may store the indicated person-specific controlling requirements (e.g., as person-specific controlling requirements 40 in memories 20) so that any image that is subsequently and initially captured by camera 35 of the image-capturing device 15 and in which the person is at least partially depicted is subject to being modified or altered in accordance with the stored person-specific controlling requirements 40 prior to the captured image being provided by or output from the device 15. In these implementations, the image-capturing device 15 may output or provide (e.g., to other devices, for presentation on displays, for storage in a data bank, etc.) only images in which the appearance of the subject person is in accordance with the person-specific set of controlling requirements 40. That is, images in which a depiction of an appearance of the subject person is not in accordance with the person-specific set of controlling requirements 40 may be prevented from being displayed on any display associated with the image-capturing device 15 and may be prevented from being output from the image-capturing device 15 and provided by the image-capturing device 15 (e.g., via communication interface 28) to any external device and/or network.

Figure 2:
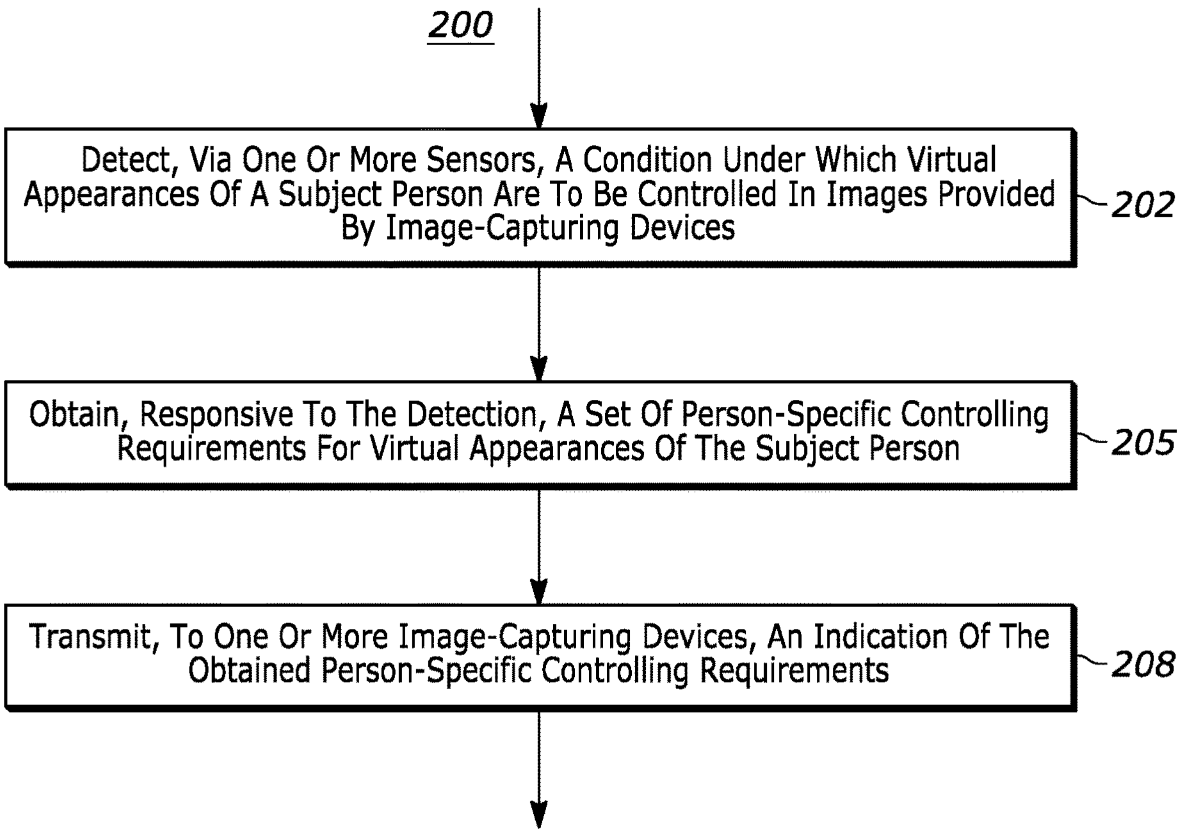
FIG. 2 depicts a flow diagram of an example method for controlling virtual appearances of people depicted in images that are provided and/or generated by image-capturing devices.

FIG. 2 depicts a flow diagram of an example method 200 for controlling virtual appearances of people depicted in images that are provided and/or generated by image-capturing devices. In an embodiment, at least a portion of the method 200 is performed by a virtual appearance controller system, such as the virtual appearance controller system 12. For example, the virtual appearance controller 48 stored on the memories 45 of the system 12 may be executed by processors 42 to cause the system 12 to execute at least a portion of the method 200. For ease of discussion herein (and not for limitation purposes), the method 200 is described with simultaneous reference to the environment 10 of FIG. 1 including the virtual appearance controller system 12 and the image-capturing device 15, although it is understood that any one or more portions of the method 200 may be utilized in other environments and performed by systems other than the example system 12 and by controlling one or more image-capturing devices other than device 15. Further, in some embodiments, at least a portion of the method 200 may operate in conjunction with at least a portion of the method 300 described elsewhere herein.

At a block 202, the method 200 may include detecting, via one or more sensors, the occurrence or presence of a condition under which virtual appearances of a subject person depicted in images that are provided by image-capturing devices are to be controlled. As previously discussed, the subject person or an agent of the subject person may have defined or otherwise specified one or more conditions under which the subject person's virtual image is to be controlled, and the indications of the defined or specified conditions may be stored 53 in the memories 45 of the virtual appearance controller system 45, for example, in conjunction with the person-specific visual appearance contents 52 of the subject person. Alternatively, the defined or specified conditions may be received via user interface 58 of the system 12. As previously discussed, the detected condition may be a condition to which is associated with the subject person, for example, an event or occasion attended by the subject person (e.g., party, red carpet event, conference, fund-raising event, etc.), a physical location at which the subject person is disposed (e.g., public space, school, camp, church, museum, etc.), a virtual location at which the subject person is disposed (e.g., on-line video call, an on-line conference or class, a gaming or other type of virtual reality environment, a smart glass environment, etc.), a reception of an instruction or command issued by the subject person (e.g., via user interface 58), a time of day, day of the week, or calendar date, and the like. As such, the one or more sensors 55 of the system 12 may include sensing devices, hardware sensors, and/or software sensors. For example, a device that is included in the system 12 and that is being worn or ported by the subject person (e.g., a PED, an accessory, an article of clothing, etc.) may include a location-based wireless transceiver and/or sensor 55 such as a global positioning system (GPS) sensor, Wi-Fi, Bluetooth, or other type of sensor that detects that the subject person is at a particular physical location and/or at a particular event. Additionally or alternatively, one or more wireless transceivers or sensors 55 of the system 12 may detect the respective presences of one or more image-capturing devices located in the vicinity of or proximate to the subject person. For example, a beacon signal generated by an image-capturing device may be detected by a wireless sensor 55 of the system 12, or an optical sensor 55 of the system 12 may detect the presence of an image-capturing device that is proximate to the subject person. Still additionally or alternatively, the system 12 may include one or more software-based sensors 55 such as a calendar sensor to detect a time/day date, an IP or other type of virtual address sensor to detect a virtual location, and the like. Of course, the user interface 58 may be included in the sensors 55 of the system 12, as the user interface 58 is configured to detect conditions received via the user interface 58 (e.g., the reception of logins, instructions or commands, etc.).

At a block 205, the method 300 may include obtaining, responsive to the detecting 202 of the condition, a set of person-specific controlling requirements 52 for virtual appearances of the subject person. For example, at least a portion of the set of person-specific controlling requirements 52 may be obtained from memory 45 of the system 12, and/or at least a portion of the set of the person-specific controlling requirements 52 may be obtained from a user interface 58 of the system 12. Typically, the obtained set of person-specific controlling requirements 52 is or has been specified at least in part by the subject person and include definitions or specifications of the virtual appearances of one or more features, aspects, bodily appearance, and/or forms of the subject person, and/or of the clothing and/or accessories worn by the subject person, e.g., in a manner such as previously discussed. In some situations, the obtained set of person-specific controlling requirements 52 may include a person-specific virtual appearance profile which has been or is defined by the subject person. Generally speaking, the obtained set of person-specific controlling requirements 52 has been or is associated with the detected condition. For example, a particular set of person-specific controlling requirements 52 may be selected, e.g., by virtual appearance controller 48 and based on the detected condition, from among a plurality of sets of controlling requirements that are specific to the subject person and that are stored in memory 45. An association of the selected set and the detected condition may have been previously stored (e.g., in memory 45), or the association of the selected set to the detected condition may be received or obtained in conjunction with the detecting 202 of the condition (e.g., via user interface 58). As previously discussed, the set of controlling requirements 52 for the virtual appearances of the subject person may include a respective definition or specification for the virtual appearance of at least one of: a gender, a body shape, a hair style, a height, a bodily form, a modification to a first feature, a substitution for a second feature, or another aspect of the virtual appearances of the subject person.

At a block 208, the method 300 may include transmitting, via a wireless transceiver and to one or more image-capturing devices, an indication of the set of controlling requirements 52 for the virtual appearances of the subject person so that a virtual appearance of the subject person depicted in one or more images that are provided by the image-capturing devices is in accordance with the set of controlling requirements. The person-specific set of controlling requirements 52 may be indicated within the transmission in any suitable manner, such as by a code (e.g., a QR code or other type of digital code), a filter (which may be applied by the image-capturing device 15 to initially-capture images), a bit map, etc., and the transmitted indication may be encrypted for security and/or privacy. In some situations, the system 12 may transmit 208 the indication of the set of person-specific requirements 52 in a point-to-point transmission from a wireless transceiver 60 of the system 12 to a particular image-capturing device 15. In some situations, the system 12 may broadcast the indication of the set of person-specific requirements 52 so that any image-capturing device within transmission range of a wireless transceiver 60 of the system 12 receives the broadcasted indication. These situations may occur, for example, at events or locations at which multiple different wireless transceivers associated with the event or location and disposed in different physical locations broadcast the set of person-specific requirements 52, e.g., so that any image of the subject person that is captured at the event or location is subject to the same set of person-specific virtual appearance requirements 52. Transmitting 208 the indication of the set of person-specific controlling requirements 52 may utilize any suitable protocol, such as a peer-to-peer wireless protocol, a Wi-Fi protocol, a Bluetooth or other short-range protocol, etc.

As previously discussed, in some arrangements, the virtual appearance controlling system 12 may store respective sets of person-specific controlling requirements 52 for multiple people, and optionally respective sets of conditions 53 corresponding to the multiple people. In these arrangements, the method 200 may include (not shown in FIG. 2) selecting a corresponding set of person-specific controlling requirements 52 to indicate to one or more image-capturing devices based on an identity of a particular subject person. The selecting may, if desired, also be based on a condition which has been detected 202. For example, the method 200 may include, upon detecting 202 the occurrence of a particular condition, selecting multiple sets of person-specific controlling requirements 52, each of which may correspond to the detected particular condition and to a different person. In this example, each selected set of person-specific controlling requirements 52 may be transmitted 208 to one or more image-capturing devices 15.

In some embodiments (not shown in FIG. 2), the method 200 may include determining a suggested controlling requirement for virtual appearances of people, where the suggested requirement corresponds to a particular condition and optionally to a particular subject person. For example, as a user is configuring sets of controlling requirements 52 for a subject person's virtual appearances and indicates a condition to store in virtual appearance conditions 53, the system 12 may determine and provide, e.g., via user interface 58 and/or communication interface 60, one or more suggested controlling virtual appearance requirements for the subject person upon the user indicating the condition. Additionally or alternatively, the system 12 may determine one or more suggested controlling requirements based one or more characteristics of the subject person (e.g., age, gender, feature, etc.). In an embodiment, determining a suggested controlling requirement for virtual appearances of a subject person may include executing, by the controlling requirements manager 50 and/or the virtual appearance controller 48, one or more analytics and/or machine-learning algorithms to generate or discover a suggested controlling requirement corresponding to a given condition and/or a given characteristic of the subject person. The method 200 may include providing the suggested controlling requirements to a user (e.g., via user interface 58 or communication interface 60).

Figure 3:
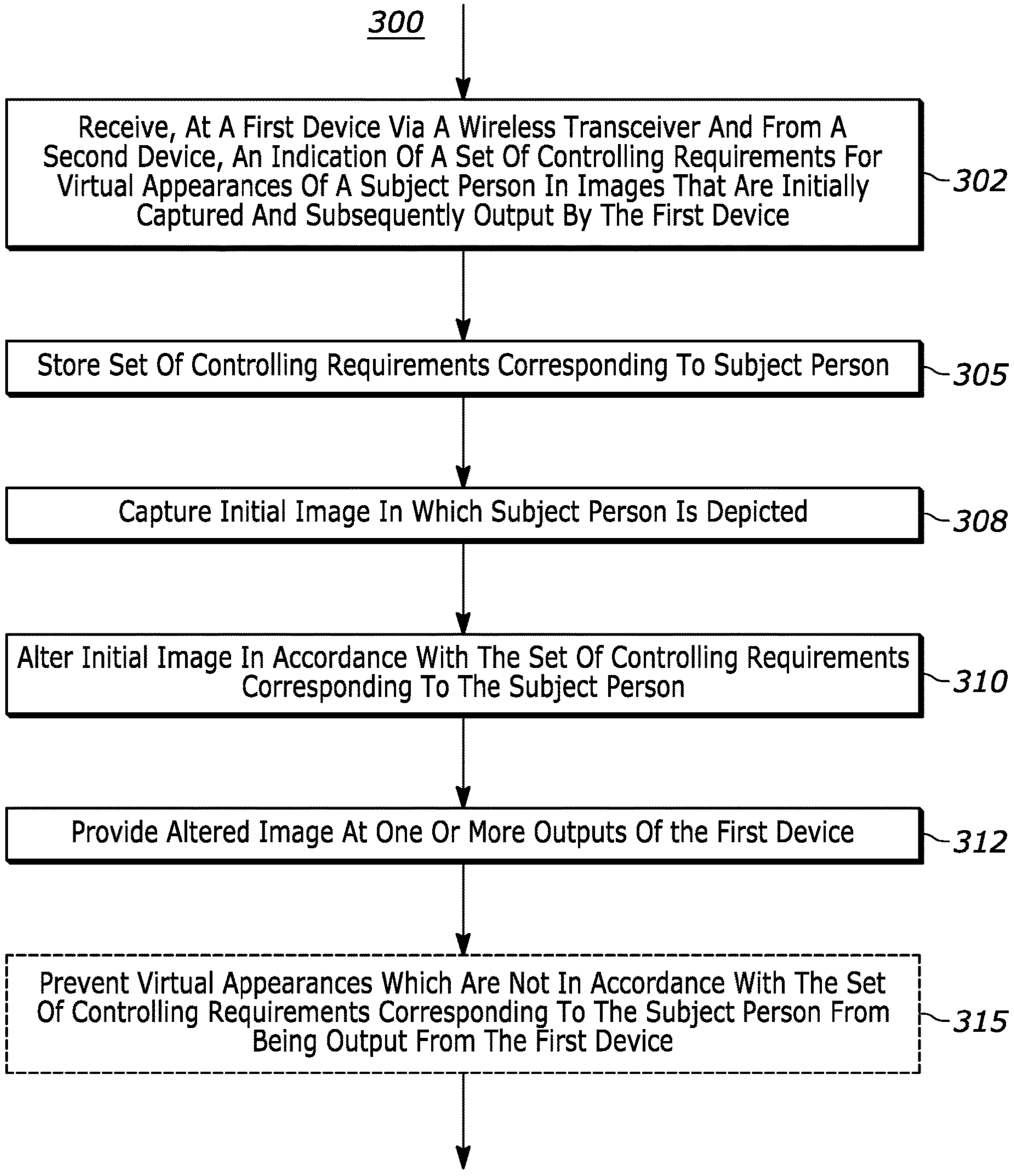
FIG. 3 depicts a flow diagram of an example method for controlling virtual appearances of people depicted in images that are provided and/or generated by image-capturing devices.

FIG. 3 depicts a flow diagram of an example method 300 for controlling virtual appearances of people depicted in images that are provided and/or generated by image-capturing devices. In an embodiment, at least a portion of the method 300 is performed by an image-capturing device, such as the image-capturing device 15 of FIG. 1. For example, the virtual appearance modifier 38 stored on the memories 25 of the image-capturing device 15 may be executed by processors 22 to cause the image-capturing device 15 to execute at least a portion of the method 300. For ease of discussion herein (and not for limitation purposes), the method 300 is described with simultaneous reference to the environment 10 of FIG. 1 including the virtual appearance controller system 12 and the image-capturing device 15, although it is understood that any one or more portions of the method 300 may be utilized in other environments and performed by devices other than the example image-capturing device 15. Further, in some embodiments, at least a portion of the method 300 may operate in conjunction with at least a portion of the method 200 described elsewhere herein.

At a block 302, the method 300 may include receiving, via a wireless transceiver of a first device and from a second device, an indication of a set of controlling requirements for virtual appearances of a subject person in images that are initially captured and subsequently output by the first device, e.g., via a display, communication interface, or other output component of the first device. Generally speaking, the set of controlling requirements as indicated to the first device is to be applied to the virtual appearance of only the subject person (and not to the virtual appearance of any other person) in images that are initially captured by and subsequently output by the first device. The first device may be an image-capturing device such as a smart glass device, an augmented reality device, a virtual reality device, a smart device, a digital camera, a personal electronic device under the control of a third-party, or any other device that captures and/or generates digital images in which depictions of people may be included, and the second device may be included in or in communicative connection with a system that stores person-specific sets of controlling requirements. Typically, the first and the second device are located within wireless transmission range of each other. In an illustrative but non-limiting example, the first device may be the image-capturing device 15, and the second device may be a device which is included in or associated with a virtual appearance controller system 12. For example, the second device may include a wireless and/or a wired transceiver included in the virtual appearance controller system 12, the second device may be a cell site, router, hotspot, or other type of access point of a wireless network to which the virtual appearance controller system 12 is communicatively connected, or the second device may be a PED that is being worn or carried by the subject person. The method 300 is discussed herein referring to the first device as the image-capturing device 15 and to the second device as a device included in or communicatively connected with the virtual appearance controller system 12; however, this is merely for the purposes of ease of illustration and is not meant to be limiting.

The set of controlling requirements for the virtual appearances of the subject person, e.g., as indicated via the transmission from the virtual appearance controller system 12 and received by the image-capturing device 15, may include at least a portion of an entirety of the set(s) of controlling requirements 52 that specifically correspond to the subject person and that are stored in the memories 45 of the system 12. The transmission may have been generated and transmitted by the system 12 using the techniques discussed elsewhere herein. The transmission including the indication of the set of controlling requirements corresponding to the subject person may be a broadcast or multicast transmission generated by the system 12, or the transmission may be a point-to-point transmission generated by the system 12. For example, in some scenarios, the transmission including the indication of the set of controlling requirements for the virtual appearances of the subject person may be a direct, wireless transmission from the device associated with the system 12 and the image-capturing device 15, e.g., a unicast transmission via a peer-to-peer wireless protocol or via a short-range wireless protocol supported by Wi-Fi®, Bluetooth®, NearLink, near-field communication (NFC), low-power wide area network (LPWAN) technology, ultra-wideband (UWB) technology, or some other suitable short-range wireless technology. In other scenarios, the transmission may be a broadcast or multicast transmission that has been generated and broadcast or multicast within the environment 10 by the system 12, potentially via multiple devices that are associated with the system 12 (e.g., multiple Wi-Fi routers, multiple Bluetooth transceivers, etc.). The selection of unicast, multicast, or broadcast of the indication of the set of controlling requirements may be made by the system 12 based on a detected condition and/or other selection criteria which may have been pre-defined by the user. Further, the transmission including the indication of the set of controlling requirements corresponding to the subject person may be encrypted by the system 12 and decrypted by the image-capturing device 15, if desired. Still further, the indication of the set of controlling requirements corresponding to the subject person may be of any suitable format such as a digital code (e.g., a QR code, a bar code, etc.), a filter, a bit map, etc., such as described elsewhere herein.

As previously discussed, the contents of the set of controlling requirements corresponding to the subject person and as indicated to the image-capturing device 15 may have been specified at least in part by the subject person and may include definitions or specifications of the virtual appearances of one or more features, aspects, bodily appearance, and/or forms of the subject person, and/or of the clothing and/or accessories worn by the subject person, e.g., manners such as previously discussed. The set of controlling requirements corresponding to the subject person and indicated to the image-capturing device 15 may include respective requirements of one or more individual features and/or aspects, and/or may include a virtual appearance profile (e.g., a combination of features and/or aspects) which has been or is defined by the subject person. Generally speaking, the obtained set of person-specific controlling requirements 52 has been or is associated with the detected condition. For example, the virtual appearance controller system 12 may have selected and/or obtained the set of person-specific controlling requirements 52 included in the transmission received by the image-capturing device 15 based on the detected condition, e.g., in manners such as discussed elsewhere herein.

At a block 305, the method 300 may include storing the set of controlling requirements corresponding to the subject person in one or more memories. For example, upon reception of the indication of the set of controlling requirements corresponding to the subject person at the image-capturing device 15, the image-capturing device 15 may store the received set of person-specific set of controlling requirements 40 in memory 25. In some embodiments of the method 300, the block 305 may be omitted.

At a block 308, the method 300 may include capturing an initial image in which the subject person is depicted. For example, the image-capturing device 15 may utilize the camera 35 to capture an initial image in which the subject person is depicted, e.g., when the subject person is within the field of view of the camera 35. In some scenarios, the captured, initial image may be a static two-dimensional image or a static three-dimensional image. In some scenarios, the captured, initial image may be a dynamic two-dimensional image or a dynamic three-dimensional image that is continuously captured over time, such as a video image. Of particular note, at the block 308, while the image-capturing device 15 captures the initial image by utilizing the camera 35, the captured, initial image remains within the image-capturing device 15 and at the block 308 is not presented on any display 32 of the device 15, is not transmitted from the device 15 via communication interface 28, and is not otherwise output (e.g., visually or digitally) from the image-capturing device 15. However, in some embodiments, the initial image that has been captured 308 may be stored in memory 25 of the image-capturing device 15.

In some embodiments (not shown in FIG. 3), the block 308 includes detecting, by the image-capturing device 15, a virtual appearance of the subject person within the captured initial image. Such detecting may include, for example, receiving an indication (e.g., wirelessly) of an identity of a subject person who is within the field of view of the camera 35, which may have been broadcasted by a PED being worn or carried by the subject person, and/or other techniques. Additionally or alternatively, such detecting may include utilizing facial recognition software and/or other facial recognition techniques to detect the virtual appearance of the subject person within the captured initial image. Of course other detection techniques may be additionally or alternatively utilized at the block 308.

In some situations, capturing 308 the initial image including the depiction of the subject person may be performed prior to receiving 302 the set of controlling requirements for virtual appearances of the subject person, and in other situations, capturing 308 the initial image including the depiction of the subject person may be performed after receiving 302 the set of controlling requirements for virtual appearances of the subject person.

At a block 310, the method 300 may include altering the initial image in accordance with the stored set of controlling requirements 40 corresponding to the subject person, thereby generating an altered image including a controlled virtual appearance of the subject person. For example, when the set of controlling requirements 40 includes a filter, block 310 may include applying the filter to the initial image to thereby alter the image. When the set of controlling requirements 40 indicates respective requirements for the virtual appearances of multiple different features and/or aspects of the virtual appearance of the subject person, block 310 may include using corresponding, automatic image-processing techniques to automatically alter the initial image in accordance with the requirements. For example, virtual appearance modifier 438 may apply the filter or may utilize the image-processing techniques to alter the initial image. The block 310 typically is performed by the image-capturing device 15 without utilizing any user (e.g., human) input. Importantly, during the altering 310 of the initial image, the initial image and any alterations to the initial image are not presented on any display 32 of the device 15, are not transmitted from the device 15 via communication interface 28, and are not otherwise output (e.g., visually or digitally) from the image-capturing device 15. Indeed, in a preferred embodiment, the blocks 302, 308, and 310 are performed prior to providing any image that is generated by the image-capturing device 15 based on an initially-captured image as an output of the image-capturing device 15, e.g., at display 32 and communication interface 28.

At a block 312, the method 300 may include providing the altered image including the controlled virtual appearance of the subject person at or via one or more outputs of the first device. For example, the altered image including the controlled virtual appearance of the subject person may be rendered on a screen or display 32 of the image-capturing device 15, the altered image may be transmitted from the image-capturing device 15 via the communication interfaces 28 to another computing device, to a data storage device, and/or to another system.

At an optional block 315, the method 300 may include preventing the initial image including the depiction of the subject person that is not in accordance with the set of controlling requirements 40 of the subject person from being output from the image-capturing device 15. In some embodiments of the block 315, the method 300 may prevent any virtual appearance of the subject person that is not in accordance with the subject person's set of controlling requirements 40 from being included in any images provided by the image-capturing device 15 at its outputs, e.g., from being output on any display 32 included and/or associated with the image-capturing device 15, from being transmitted from the device 15 via any communication interface 28, and from otherwise being output from the device 15 in any manner. As such, in these embodiments, controlled virtual appearances of the subject person may be the only virtual appearances of the subject person that are included in images provided by the image-capturing device 15 via any output of the image-capturing device 15.

It is noted that when the initial image captured by the image-capturing device 15 is a video image that changes over time, at least the block 310 of the method 300 may be performed over time in conjunction with the changing video image. That is, the controlled virtual appearance of the subject person within the video image provided via the one or more outputs of the first device may, throughout the entirety of the video, be controlled or modified in real-time in accordance with the stored set of controlling requirements for the virtual appearances of the subject person.

In some scenarios, the image-capturing device 15 may receive one or more other sets of controlling requirements for controlling the virtual appearances of one or more people other than the subject person. Consequently, the image-capturing device 15 may provide images in which the one or more other people are depicted in accordance with their respective sets of controlling requirements. Accordingly, in embodiments (not shown in FIG. 3), the method 300 may include receiving, via the wireless transceiver and from the second device or from a third device, an indication of a set of controlling requirements for virtual appearances of a second person in images that are initially captured and subsequently provided or output by the image-capturing device 15. The second device may be the same device from which the set of controlling requirements corresponding to the subject person were received (e.g., a device associated with the virtual appearance controlling system 12), and third device may be another device. For example, the third device may be a second device which is in communication connection with the virtual appearance controlling system 12 (e.g., another router, another PED, etc.), or the third device may be a device which is in communicative connection with another virtual appearance controlling system altogether. In these embodiments, the image-capturing device 15 may perform at least blocks 305-315 of the method 300 (and any optional blocks, if desired) with respect to the received set of controlling requirements for virtual appearances of the second person in images that are initially captured and subsequently generated by the image-capturing device 15. Indeed, in some situations, a single image that is provided or output from the image-capturing device 15 may include the respective controlled, virtual appearances of two or more people for which the image-capturing device 15 has received a respective set of controlling requirements.

This detailed description is to be construed as exemplary only and does not describe every possible embodiment, as describing every possible embodiment would be impractical, if not impossible. One may implement numerous alternate embodiments, using either current technology or technology developed after the filing date of this application.

Although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A first device, comprising:

an image-capturing component including at least one image sensor;

a wireless transceiver;

one or more processors; and one or more memories storing computer-executable instructions that, when executed by the one or more processors, cause the first device to:

receive, via the wireless transceiver and from a second device that is a personal electronic device (PED) of a subject person, an indication of a set of controlling requirements for virtual appearances of the subject person in images that are output by the first device, the set of controlling requirements specified at least in part by the subject person and including a first indication that (i) under a first condition, a first set of virtual appearance contents is to be applied to alter images captured by the first device prior to the first device providing the captured images via one or more outputs of the first device, and (ii) under a second condition, a second set of virtual appearance contents is to be applied to alter the captured images prior to the first device providing the captured images via the one or more outputs of the first device, the first set of virtual appearance contents and the second set of virtual appearance contents being different sets, and the indication of the set of controlling requirements being received by the first device (a) responsive to a detection, by the second device, of a presence of the first device, and (b) while the subject person is within a field of view of the image-capturing component and prior to a capture, by the first device, of an initial image in which the subject person is depicted;

subsequent to the reception of the indication of the set of controlling requirements corresponding to the subject person, capture, via the image-capturing component, the initial image in which the subject person is depicted;

alter the initial image in accordance with the set of controlling requirements corresponding to the subject person, thereby generating an altered image including a controlled virtual appearance of the subject person; and provide the altered image via the one or more outputs of the first device.

2. The first device of claim 1, wherein the one or more outputs of the first device include a display, and the altered image including the controlled virtual appearance of the subject person is rendered on the display.

3. The first device of claim 1, wherein the one or more outputs include a communication interface, and the first device transmits the altered image including the controlled virtual appearance of the subject person to a third device via the communication interface.

4. The first device of claim 1, wherein the computer-executable instructions are further executable by the one or more processors to cause the first device to prevent the initial image of the subject person from being provided to any display and/or any other device.

5. The first device of claim 1, wherein:

the computer-executable instructions cause the first device further to store the set of controlling requirements corresponding to the subject person in the one or more memories; and based on the stored set of controlling requirements corresponding to the subject person, controlled virtual appearances of the subject person are the only virtual appearances of the subject person provided by the first device to any display and via any output of the first device.

6. The first device of claim 1, wherein:

the initial image of the subject person is a video image of the subject person that changes in real-time; and the altered video image including the controlled virtual appearance of the subject person and provided via the one or more outputs of the first device changes in real-time in accordance with the set of controlling requirements for the virtual appearances of the subject person.

7. The first device of claim 6, wherein the indication of the set of controlling requirements includes a filter received from the second device, the first device applies the received filter to the initial image exclusive of any human input, and the controlled virtual appearance of the subject person is maintained in accordance with the set of controlling requirements throughout an entirety of the video image.

8. The first device of claim 1, wherein the first device receives the indication of the set of controlling requirements for the virtual appearances of the subject person via the wireless transceiver and at least one of a broadcast transmission or a point-to-point transmission generated by the second device.

9. The first device of claim 1, wherein the indication of the set of controlling requirements corresponding to the subject person is an encrypted indication, and the first device and the second device communicate via at least one of a peer-to-peer wireless protocol or a short-range wireless protocol.

10. The first device of claim 1, wherein at least one of:

at least a portion of the computer-executable instructions is included in a client application that is stored on and executing at the first device; or at least a portion of the computer-executable instructions is included in an operating system of the first device.

11. The first device of claim 1, wherein the first device is a smart glass device, an augmented reality device, a virtual reality device, a digital image-capturing component, or a personal electronic device operated by a user other than the subject person.

12. The first device of claim 1, wherein the alteration of the initial image is performed by the first device exclusive of any human input.

13. The first device of claim 1, wherein the indication of the set of controlling requirements for the virtual appearances of the subject person is a code.

14. The first device of claim 1, wherein the set of controlling requirements for the virtual appearances of the subject person includes a filter, and the alteration of the initial image includes an application of the filter.

15. The first device of claim 1, wherein the set of controlling requirements for the virtual appearances of the subject person includes respective controlling requirements for depictions of at least one of: an overall virtual appearance of the subject person as a whole, a gender, a body shape, a hair style, a height, a bodily form, a modification to a first specific feature, a substitution for a second specific feature, or another aspect of the virtual appearances of the subject person.

16. The first device of claim 1, wherein the first device is further configured to:

receive, via the wireless transceiver and from the second device or from a third device, an indication of a set of controlling requirements for virtual appearances of a second person in images;

store the set of controlling requirements corresponding to the second person in the one or more memories;

subsequent to the storage of the set of controlling requirements corresponding to the second person, capture, via the image-capturing component, an image in which the second person is depicted;

alter a virtual appearance of the second person depicted in the captured image in accordance with the stored set of controlling requirements corresponding to the second person, thereby generating a controlled virtual appearance of the second person; and provide the controlled virtual appearance of the second person via the one or more outputs.

17. The first device of claim 16, wherein the captured image in which the virtual appearance of the second person is depicted is the initial image in which the subject person is depicted, and the altered image includes the controlled virtual appearance of the subject person and the controlled virtual appearance of the second person.

18. The first device of claim 1, wherein the first condition and the second condition include two or more of: a presence of a specific image-capturing device, a presence of any image-capturing device, a date, a time, a specific physical location, a type of physical location, a specific virtual location, a type of virtual location, an event, an event type, a user instruction or command, or another type of condition detected by one or more sensors.

19. The first device of claim 1, wherein the set of controlling requirements for the virtual appearances of the subject person includes respective controlling requirements for depictions of at least one of accessories or clothing worn by the subject person.

20. The first device of claim 1, wherein the indication of the set of controlling requirements is received at the first device via a direct wireless transmission from the second device to the first device, and the first device stores the set of controlling requirements in the one or more memories and, based on the stored set of controlling requirements, alters each image subsequently captured by the image-capturing component and in which the subject person is depicted.

* * * * *